United States Patent [19]

Payne

[11] 3,894,555
[45] July 15, 1975

[54] FLOAT SWITCH ASSEMBLY

[75] Inventor: Richard E. Payne, Mansfield, Ohio

[73] Assignee: The Tappan Company, Mansfield, Ohio

[22] Filed: Nov. 14, 1973

[21] Appl. No.: 415,745

[52] U.S. Cl. ............ 137/412; 137/429; 73/322.5; 134/57 D
[51] Int. Cl. .................. D06f 39/08; G05d 9/12
[58] Field of Search ........... 137/386, 387, 410, 412, 137/428, 429, 430, 432; 73/322.5; 134/57 D; 200/84

[56] References Cited
UNITED STATES PATENTS

| | | | |
|---|---|---|---|
| 3,464,437 | 9/1969 | Zane | 137/412 X |
| 3,610,271 | 10/1971 | Jarvis | 137/412 |

Primary Examiner—Martin P. Schwadron
Assistant Examiner—David R. Matthews
Attorney, Agent, or Firm—Donnelly, Maky, Renner & Otto

[57] ABSTRACT

A float switch assembly for a dishwasher or the like includes a float positioned in the bottom of the dishwasher tub and having an elongated float stem extending through a hollow sleeve sealingly secured around an opening in the bottom of the tub. The free end of the float stem engages a switch actuator beneath the tub. The weight of the float normally holds the switch closed. A predetermined level of water in the tub raises the float to a position wherein the switch opens to close a water inlet valve. The float is molded in one piece from plastic material having a specific gravity less than unity so that trapped air alone is not relied upon to make the float buoyant. The float has a very low profile and a low center of gravity so it does not interfere with the dishwasher spray arm and does not easily tilt.

7 Claims, 2 Drawing Figures

PATENTED JUL 15 1975 3,894,555

FLOAT SWITCH ASSEMBLY

BACKGROUND OF THE INVENTION

This application pertains to the art of float switch assemblies of the type which are responsive to a predetermined water level in a tub for operating a switch to close a water inlet valve. The invention is particularly applicable for use with dishwashers and will be particularly described with reference thereto. However, it will be appreciated that the invention has broader aspects and may be used with other devices, such as clothes washers.

A float switch assembly of a known type is shown and described in Zane U.S. Pat. No. 3,464,437 as including a float positioned in the bottom of a tub and having an elongated float stem extending through a vertical tube formed integral with the tub. This float includes a flange extending outwardly adjacent the upper end of the float. A pair of radially-spaced cylindrical walls extend downwardly from the float flange to define an annular air chamber for rendering the float buoyant, so that the float has a very high and wide profile, requiring use of a relatively large amount of material. Such float also includes an annular space around the stem receiving the vertical tube, with an inwardly extending shoulder in the upper end portion thereof. When the float moves upwardly due to the presence of a predetermined amount of water in the tub, the shoulder will move above the upper end of the vertical tube; when the water level drops, the shoulder could cause the float to hang up on the top end of the vertical tube and make it necessary to manually reset the float to be again operative.

In the assembly of the Zane patent, the float stem is also pivotally attached to a pivoted lever which operates plural switches, requiring an additional assembly operation during manufacture of the device. One switch operated by such prior float completely de-energizes the dishwasher time in order to close the water inlet valve. This makes it impossible for the dishwasher to go through a normal cycle even if the presence of excess water in the tub is due to normal condition which sometimes occurs. For example, a dishwasher usually includes a pressure regulator in the water inlet line so that water will flow into the dishwasher tub at a predetermined constant rate, the timer opening the water inlet valve for a predetermined period of time to introduce a predetermined quantity of water into the tub. In the Zane patent, introduction of too much water into the tub due to a malfunction causes the float to completely de-energize the timer and close the water inlet valve. However, the presence of slightly too much water in the tub may be due to an accidental double fill of the tub by the housewife or could also be caused by a partially blocked drain. Such a condition if experienced in operation of the patent dishwasher would preclude use of the same until the condition is corrected. Water pressure in certain areas also may occasionally be sufficiently in excess of that expected to be encountered, so that the pressure regulator cannot assure delivery of water at the desired predetermined rate to the tub. A float switch assembly of the type described in the Zane patent would completely shut down the dishwasher and prevent its operation in such case or if for any reason the water pressure might exceed the desired maximum.

Moreover, a float member positioned in a dishwasher is repeatedly heated and cooled, so that it suffers from thermal shock, and it is also battered about during operation of the dishwasher. As a result, cracks may occur in the float, and if dependent upon trapped air for buoyancy could fail to operate should such damage and resultant leakage occur.

SUMMARY OF THE INVENTION

In accordance with the present invention, a float switch assembly includes an elongated substantially cylindrical sleeve member having an axial hole therethrough and an outwardly extending bottom flange. The flange is sealingly secured to the bottom wall of a tub with the sleeve member positioned substantially vertically and with the axial hole aligned with an opening in the bottom wall of the tub. A one-piece float molded of plastic material having a specific gravity less than unity includes a hollow generally bell-shaped central portion having a closed top, an inner peripheral surface, a downwardly facing open bottom, and a bottom peripheral end. The float includes an elongated central stem extending through the central portion from the closed top thereof and terminating at a free stem end spaced a substantial distance downwardly from the bottom peripheral end of the central portion. The stem has an outer peripheral surface spaced inwardly from the inner peripheral surface of the central portion to define an annular space extending from the bottom peripheral end to the closed top and having a substantially uniform cross-sectional area throughout its length. A float flange extends outwardly from the central portion adjacent the bottom peripheral end thereof. The sleeve member is freely received in the annular space, and the stem extends through the axial hole in the sleeve and the opening in the tub bottom wall. A switch for controlling flow of water to the tub is mounted beneath the tub for operation by the free end of the stem as the float rises and falls with variations in water level in the tub.

In accordance with a preferred arrangement, the float flange includes a downwardly extending terminal portion having a peripheral end spaced downwardly from the bottom peripheral end of the central portion. This downwardly extending terminal flange portion is adapted to extend down into the water for displacing a significant volume of water for aiding in rendering the float buoyant.

In the preferred arrangement, the sleeve member is molded in one piece of plastic material and includes a plurality of circumferentially-spaced ribs extending outwardly from the bottom flange. The ribs reinforce the cylindrical sleeve member against bending or breakage and also provides a mass of material in which circumferentially-spaced screw receiving holes are formed for securing the sleeve member to the tub bottom wall.

The switch operated by the float is connected in series between timer contacts and a water inlet solenoid valve. The switch is of the normally open type and is held closed by the weight of the depressed float. When the float rises in response to the presence of a predetermined water level in the tub, the switch opens to close the water inlet valve, while the timer continues to operate so that the dishwasher will go through a complete operating cycle.

The float switch assembly is preferably located in a corner portion of the dishwasher tub. An abutment means is secured to the stem intermediate the free stem end and the bottom of the tub for preventing vertical displacement of the stem completely through the sleeve member.

It is a principal object of the present invention to provide an improved float switch assembly which is economical to manufacture and assemble and reliable in operation.

Another object of the present invention is to provide a float switch assembly having a float which presents a very low profile and is molded of a material having a specific gravity less than unity.

An additional object of the invention is to provide a float switch assembly with an improved sleeve member through which the float extends.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

DESCRIPTION OF A PREFERRED EMBODIMENT

Figure 1:
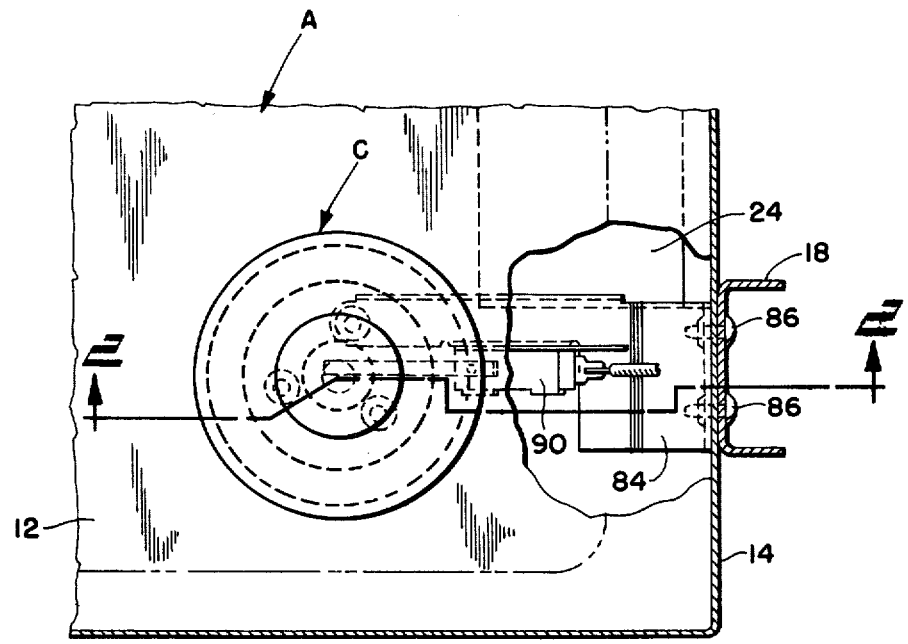
FIG. 1 is a partial cross-sectional plan view of a dishwasher tub having the improvement of the present invention incorporated therein and with portions cut away for clarity of illustration.
Figure 2:
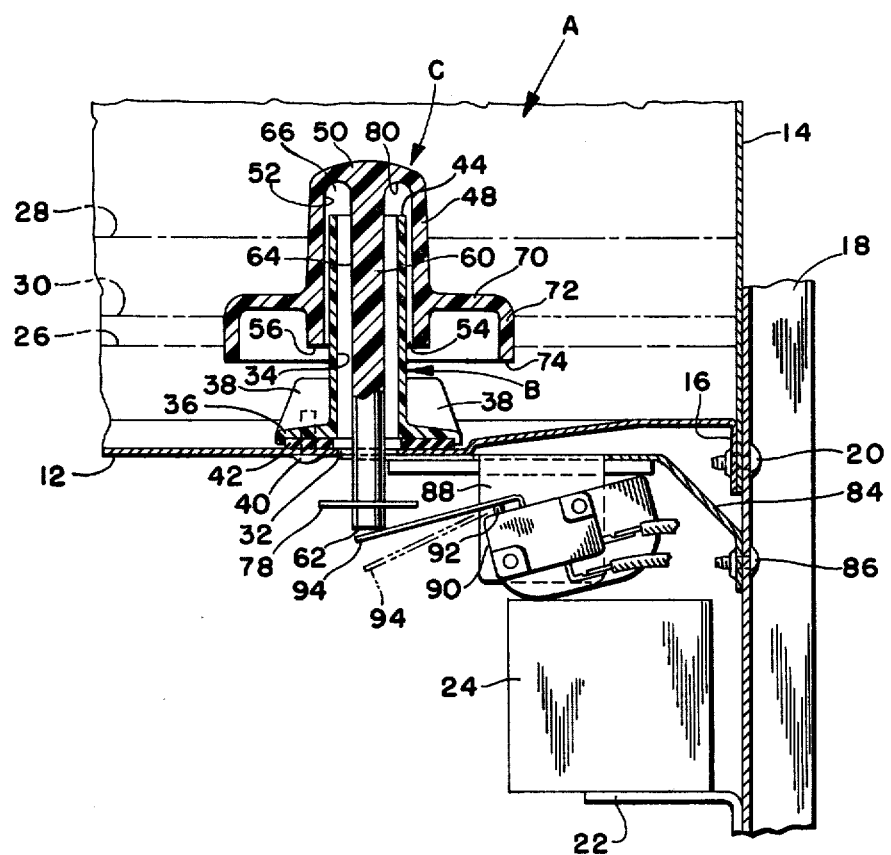
FIG. 2 is a cross-sectional elevational view looking generally in the direction of arrows 2—2 of FIG. 1.

Referring now to the drawing, wherein the showings are for purposes of illustrating a preferred embodiment of the invention only and not for purposes of limiting same, FIG. 1 shows a dishwasher tub A having a bottom wall 12 and a peripheral wall 14. As shown in FIG. 2, bottom wall 12 has a downwardly extending peripheral flange 16 which is sealed to the bottom portion of peripheral wall 14 in a known manner. Bottom wall 12 has a generally rectangular shape in plan view and includes four corner portions, only one of which is shown in FIG. 1. Bottom wall 12 is somewhat dished, slopes downwardly from its outer periphery toward its center and is formed with a horizontal portion in at least one corner thereof for mounting the float switch assembly of the present invention thereto. Tub A has a mounting channel 18 secured thereto as by bolt and nut assemblies 20 extending through suitable holes in channel 18, peripheral wall 14 and bottom wall flange 16. Channel 18 extends downwardly a substantial distance below bottom wall 12 as seen in FIG. 2. Channel 18 has a bracket 22 suitably secured thereto for mounting a solenoid-operated valve 24 which is connected in a conduit leading from a pressurized source of water to a water inlet located in tub A.

The dishwasher includes a conventional timer for operating the dishwasher through a complete cycle. The timer includes cam operated switch contacts for energizing solenoid valve 24 for a predetermined period of time for introducing a predetermined volume of water into tub A. The predetermined volume of water introduced into tub A during normal operation is represented by water level shadow line 26 in FIG. 2. Shadow line 28 represents an overflow lip. If the water level in tub A reaches overflow lip 28, water will overflow onto the floor. When a malfunction or other abnormal operating condition occurs so that the water level in tub A rises substantially above normal level 26, the improved float switch assembly of the present invention is designed to close valve 24 when the water reaches a level represented by shadow line 30 which is somewhat above normal water level 26 and substantially below overflow level 28.

Bottom wall 12 has a small substantially circular opening 32 therethrough. An elongated substantially cylindrical sleeve member B has a cylindrical axial hole 34 therethrough and an outwardly extending circumferential bottom flange 36. Three circumferentially-spaced vertical ribs 38 extend upwardly from bottom flange 36 to stiffen the cylindrical portion of sleeve member B and to provide a mass of material in which screw receiving holes are formed. Sleeve member B is preferably molded in one piece from rubber or synthetic plastic material. Polypropylene has been found to be a preferred type of synthetic plastic material, although it will be appreciated that other materials can be used. A plurality of circumferentially-spaced screw receiving holes are formed in tub bottom wall 12 outwardly of opening 32 for receiving screws 40 which extend into the screw receiving bores in ribs 38. An elastomeric disc gasket 42 is positioned between flange 36 and tub bottom wall 12. Tightening of screws 40 compresses gasket 42 and sealingly secures flange 36 against tub bottom wall 12. Top end 44 of sleeve member B preferably extends a substantial distance above overflow line 28 so that water cannot flow through sleeve member B in the unlikely event that the water level does reach overflow level 28.

A float C is molded in one piece of rubber or synthetic plastic material having a specific gravity less than unity on a scale wherein water has a specific gravity of unity. The specific gravity of the material from which float C is molded may have a specific gravity approaching 0.9. Polypropylene has been found to be a highly desirable material for float C. However, it will be appreciated that other materials can also be used.

Float C includes a hollow generally bell-like central portion 48 having a closed top 50, a substantially cylindrical inner peripheral surface 52, a downwardly opening bottom portion 54, and a bottom peripheral end 56.

A centrally located generally cylindrical elongated stem 60 extends completely through central portion 48 from closed top 50 thereof and terminates in a free end 62 spaced a substantial distance downwardly from tub bottom wall opening 32. Stem 60 has a generally cylindrical outer surface 64 spaced radially inward from inner peripheral surface 72 of central portion 48 to define a generally circular annular space 66 extending from bottom peripheral end 56 to closed top 50 and having a substantially uniform cross-sectional area throughout its length. When it is stated that annular space 66 has a substantially uniform cross-sectional area throughout its length, it is intended to mean that there are no shoulders or other sharp interruptions in smooth surfaces 52 and 64. It will be recognized that inner peripheral wall 52 and outer peripheral surface 64 may be somewhat conical to provide draft for aiding in removal of float C from a mold. Therefore, annular space 66 may decrease somewhat in cross-sectional area from bottom peripheral end 56 toward closed top 50.

Float C has a circumferential float flange 70 extending outwardly therefrom adjacent bottom peripheral end 56 of central portion 48. When it is stated that float flange 70 is adjacent bottom peripheral end 56, it is intended to mean that flange 70 is located below the vertical center of central portion 48 and much closer to bottom peripheral end 56 than to closed top 50. Float flange 70 terminates in a downwardly extending circumferential terminal flange portion 72 having a downwardly facing terminal flange end 74 located downwardly from bottom peripheral end 56 of central portion 48. The width of annular space 66 is substantially greater than the thickness of the wall of sleeve member B so that float C can freely move up and down relative to sleeve member B. Likewise, the diameter of stem 60 is substantially less than the inner diameter of axial hole 34.

An abutment member 78 is secured to stem 60 intermediate free stem end 62 and tub bottom opening 32 for preventing complete displacement of stem 60 up through sleeve member B. This prevents float C from becoming completely displaced from its position on sleeve member B during shipment or for other unintentional reasons.

As shown in FIG. 2, float C is positioned with sleeve member B received in annular space 66, and with stem 60 extending completely through axial hole 34 and tub bottom opening 32. In the normal position of float C, terminal end 80 of annular space 66 rests against top end 44 of sleeve member B and bottom peripheral end 56 is spaced slightly upward from the top of ribs 38. In this normal position, float C does not move up or down as the dishwasher is used and filled with the predetermined desired volume of water represented by shadow line 26.

A switch mounting bracket 84 is secured to channel 18 by suitable bolt and nut assemblies 86. One of screws 40 also attaches bracket 84 to tub bottom wall 12. Bracket 84 has a downwardly extending flat flange 88 on which a normally open switch 90 is mounted. Switch 90 has an actuator button 92, and an elongated actuator arm 94 is pivotally connected with switch 90 and extends over the top of button 92. During normal operation of the dishwasher, actuator arm 94 is in the lower shadow line position shown so that button 92 is depressed and switch 90 is closed. The weight of float C holds switch 90 closed. Switch 90 is connected in series between cam operated electrical timer contacts and solenoid valve 24. During normal operation of the dishwasher, float C does not move and actuator arm 94 is always held in the shadow line position shown so that switch 90 is closed. If a malfunction or abnormal operating condition occurs so that the water level exceeds normal operating level 26 and approaches level 30, float C will float upward to the position shown so that actuator arm 94 will move upward to the solid line position and allow button 92 to extend for opening switch 90. This will interrupt the circuit to solenoid valve 24 so that the water supply will be shut off. The timer will continue to run so that the dishwasher will go through a complete normal cycle.

Line 30 in FIG. 2 also represents the float line for float C. That is, when water in tub 12 is at level 30, float C is floating in the position shown. Terminal flange portion 72 is substantially completely submerged. A small amount of air is trapped between terminal flange portion 72 and central portion 48. However, float C is primarily buoyant due to the fact that it has a specific gravity less than unity and displaces sufficient water to float. In the event float C is cracked or otherwise defective, it will still operate because it is made of a material which is naturally buoyant.

It will be recognized that float C has a very low profile so it is easily placed in a dishwasher tub without interfering with operation of the dishwasher spray arm or with the dishwasher rack. Float C also has a very low center of gravity so it does not tilt when it floats upward. Tilting of the float may cause it to hang up on the sleeve and prevent automatic resetting. The center of gravity of the float is preferably well below the vertical center of the entire float.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

The embodiments of the invention in which an exclusive property or privilege is claimed are defined as follows:

1. A float switch assembly for a tub having a bottom wall, comprising: an opening through said bottom wall, an elongated substantially cylindrical sleeve member having an axial hole therethrough and an outwardly extending bottom flange, said flange being sealingly secured to said bottom wall with said sleeve member positioned substantially vertically above said bottom wall and with said axial hole aligned with said opening, a float member formed from a material having a specific gravity less than unity, said float member including a hollow generally bell-shaped central portion having a closed top, an inner peripheral surface, a downwardly facing open bottom and a bottom peripheral end, said float member including an elongated central stem extending through said central portion from said closed top thereof and terminating at a free stem end spaced a substantial distance downwardly from said bottom peripheral end of said central portion, said stem having an outer peripheral surface spaced inwardly from said inner peripheral surface of said central portion to define an annular space extending from said bottom peripheral end to said closed top and having a substantially uniform cross-sectional area throughout its length, a relatively shallow float flange extending outwardly from said central portion adjacent said bottom peripheral end thereof, said float flange including a downwardly extending terminal float flange portion having a peripheral float flange end spaced downwardly from said bottom peripheral end of said central portion, said sleeve member being freely received in said annular space and said stem extending through said axial hole and said opening in said tub bottom wall, switch means for controlling flow of water to said tub, and switch actuator means engaged with said free stem end for operating said switch means as said float member rises and falls with variations in water level in said tub.

2. The assembly of claim 1 wherein said sleeve member includes a plurality of circumferentially-spaced ribs extending upwardly from said flange thereof.

3. The assembly of claim 2 and including a plurality of circumferentially-spaced screw receiving holes in said tub bottom wall around said tub opening, said ribs including screw receiving bores aligned with said screw receiving holes.

4. The assembly of claim 1 and including normally closed solenoid-operated valve means for admitting water to said tub, timer contact means for controlling operation of said valve means, said switch means being connected in series between said timer contact means and said valve means.

5. The assembly of claim 1 wherein said bottom wall has a substantially rectangular cross-sectional shape and includes corner portions, said bottom wall opening being in one of said corners.

6. The assembly of claim 1 wherein said switch means comprises a normally open switch and is normally closed by the weight of said float member on said actuator, said float member being floatable upward upon a predetermined level of water in said tub to release said actuator for opening said switch.

7. The assembly of claim 1 and further including abutment means on said stem intermediate said stem end and said bottom wall opening for abutting said bottom wall adjacent said opening to prevent vertical displacement of said stem end through said opening.

* * * * *